United States Patent [19]
Best

[11] Patent Number: 5,358,259

[45] Date of Patent: Oct. 25, 1994

[54] TALKING VIDEO GAMES

[76] Inventor: Robert M. Best, 777 108th Ave. NE., Ste. 2460, Bellevue, Wash. 98004

[21] Appl. No.: 140,266

[22] Filed: Oct. 21, 1993

Related U.S. Application Data

[63] Continuation of Ser. No. 614,843, Nov. 14, 1990, abandoned.

[51] Int. Cl.⁵ .............................................. A63F 9/22
[52] U.S. Cl. .................................................... 273/434
[58] Field of Search ............... 273/433, 434, 435, 436, 273/437, 438, DIG. 28, 85 G; 434/323; 364/410

[56] References Cited

U.S. PATENT DOCUMENTS

| | | | |
|---|---|---|---|
| 4,305,131 | 12/1981 | Best . | |
| 4,333,152 | 6/1982 | Best | 434/323 |
| 4,445,187 | 4/1984 | Best | 434/323 |
| 4,569,026 | 2/1986 | Best | 434/323 |
| 4,846,693 | 7/1988 | Baer . | |
| 4,884,972 | 12/1988 | Gasper . | |
| 5,006,987 | 4/1991 | Harless | 434/321 |

FOREIGN PATENT DOCUMENTS 0016314 10/1980 European Pat. Off. .
0299831 1/1989 European Pat. Off. .

OTHER PUBLICATIONS

Best: Movies That Talk Back, IEEE Transactions on Consumer Electronics, vol. CE-26, Aug. 1980.
Lombardi: Spellcasting 101, Computer Gaming World, No. 76, Nov. 1990 issue, pp. 20, 22, 94.
Talking Back to the Tube, Newsweek issue of Dec. 3, 1990, pp. 56, 57.

Primary Examiner—Jessica J. Harrison
Attorney, Agent, or Firm—Graybeal Jackson Haley & Johnson

[57] ABSTRACT

Talking video games can provide simulated voice dialog between human players and animated characters on a TV screen. Two or more players can take turns responding to animated characters and two or more animated characters can respond to each player and to each other, thereby providing three-way or four-way conversations. Pictures and voices are generated from digital data separately stored on a laser-readable disk such as a CD-ROM in compressed form. As the game is played each animated character talks to the human game players and waits for a response. Each player has a hand-held controller that displays two or more phrases or sentences and a player responds by pressing a button next to a selected phrase. An animated character then responds to the selected phrase as if it had been spoken by the human player. Speech recognition is not required. Each scene branches to two or more subsequent scenes. But within each scene there are several branching dialog sequences, thereby providing a large variety of possible dialogs. Human game players are thus given an illusion of having dialogs with interesting people, either living, historical or imaginary and with animal-like characters on a TV screen as an active participant in adventures and dramas with these characters. Additionally, human game players can utilize the hand held controllers to select the voice dialog between game characters, thus controlling conversations held between game characters during the game.

16 Claims, 8 Drawing Sheets

FIG. 5
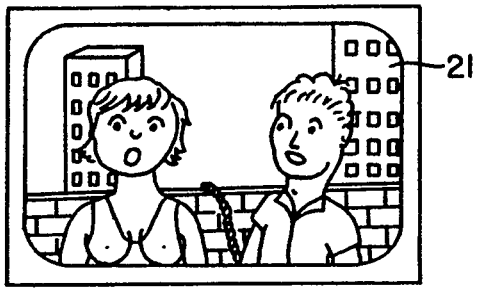
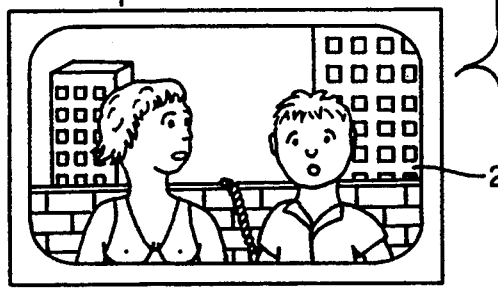
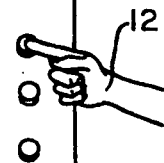
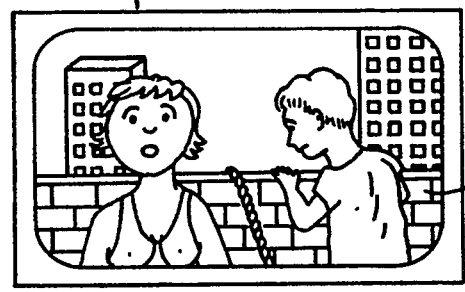

FIG. 6
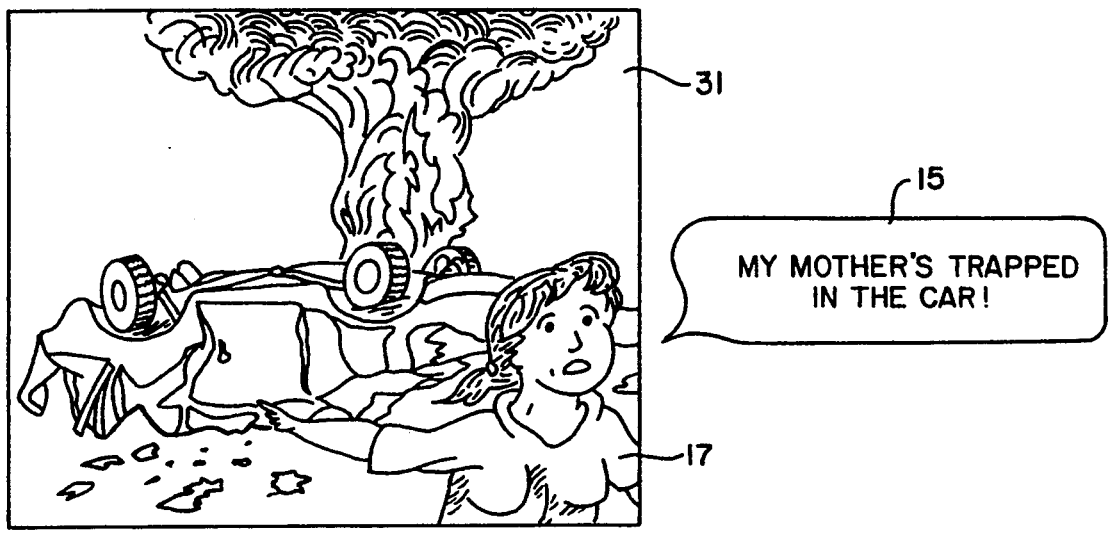
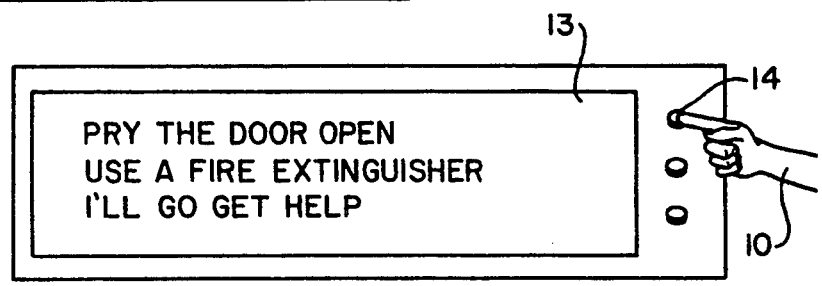
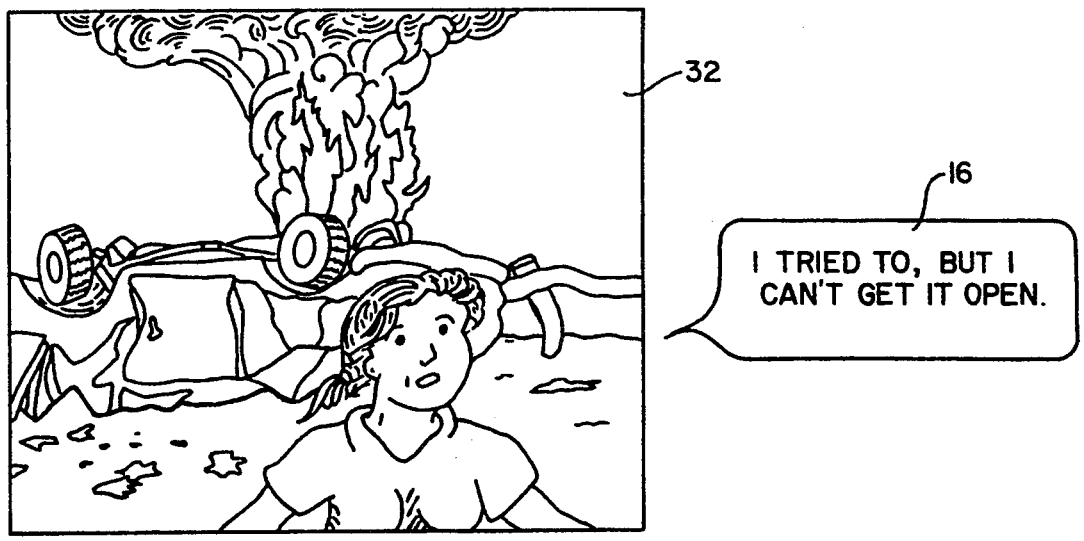

TALKING VIDEO GAMES

This application is a continuation of application Ser. No. 07/614,843, filed Nov. 14, 1990, now abandoned.

TECHNICAL FIELD OF THE INVENTION

This invention relates to video games, animated cartoons, and picture/sound synchronization.

BACKGROUND OF THE INVENTION

We are all born with a desire to talk and to be talked to. Most of us find talking a pleasant experience and we do it more often for pleasure than for necessity. Listening to other people talk and thereby sharing their emotional experiences is also a desire we are born with and this desire has been exploited in motion picture film and television in which voice sounds are now essential. But until recently, voice sounds were seldom used in video games or were used as an optional gimmick to add a little realism to the game, rather than to simulate dialog. The large amount of memory required for good quality voice sounds has made voice impractical for home video games, until recently. But now lower memory prices and digital disks such as the CD-ROM and compression techniques have made talking video games practical.

But adding voice sounds to conventional video games is not enough to simulate a face to face voice conversation. A talking video game called Thayer's Quest was attempted in 1984 and was played from an analog laser-readable video disc. One of the reasons for the commercial failure of Thayer's Quest was that each spoken sentence was programmed to accompany only one sequence of video frames. Since the video was not compressed, the maximum amount of play time was limited to about half an hour which was further reduced to a fraction of that by the branching story. Hence, only a few minutes of voice sounds were actually heard during the game. Whenever a human player saw a certain video character, the character always spoke the same words. This greatly reduced the entertainment value of the game. Another consequence of programming the audio and video to be inseparable, was that branching scenes were not distinguished from branching dialog. Human players were able to navigate through a maze of roads, but the game play did not feel like a conversational dialog. It was more like "Which road do you want to take next: (1) or (2) or (3)? Make your selection." Talking video games will be much more entertaining if each scene has a rich variety of possible dialog sequences.

Talking video games are disclosed in my U.S. Pat. Nos. 4,305,131; 4,333,152; 4,445,187 and 4,569,026.

Another problem in the prior art is how to prevent a combinatorial explosion, i.e. an exponential increase of scenes if each branch branches, and each of those branch, etc. If branches did not merge or loop, the limited amount of bytes on the CD-ROM would be quickly exhausted after less than a dozen branches. Branches should usually merge with other branches or loop back to prior scenes. But this does not mean that repeated scenes should play exactly the same each time. Each time a scene is repeated there should be different dialog and/or different characters. Successful games of the past have made use of a rich variety of possible plays against a simple repetitive background. Chess has been popular for centuries with only a very basic checkered background. Pac-Man did quite well even though it had only a simple background maze. Recent video games also make use of a repetitive background. The reason these games have high play value is the large variety of possible plays and sequences of plays in each situation. And so it should be with talking video games.

It is common practice in the video game art for stories to branch. It is also common practice for digital data of animated characters to be stored separately from background scenery and to generate each frame of an animated picture from both the background data and the character data to minimize the number of stored images.

It is a well known for human players to input choices using any of a variety of input devices such as push buttons, rotatable knobs, pressure sensitive membrane, proximity sensitive pads or screen overlay, light pen, light sensitive gun, joy stick, mouse, track ball, moving a cursor or crosshairs or scrolling through highlighted options, speech recognition, etc.

In the prior art, each choice by the human can be immediately followed by a synthesized voice or digitized voice recording that speaks the words selected by the human player, so the human will quickly adjust to the fact that the spoken words he hears for his side of the dialog are initiated by his fingers rather than his vocal cords.

The characters in video games and computer games, especially role-playing games, are of two types: player-controlled characters (or player characters) and non-player characters. A player-ccontrolled character is a human player's animated counterpart and does what the human player chooses to have him do. Non-player characters do only their pre-programmed actions and speak their fixed speeches and are not directly controlled by a human player. However, non-player characters can be indirectly influenced by a human player, either by responding to an action selected by the human or be responding to what a player-controlled character does or says.

The prior art also includes methods for generating video images of moving lips and facial expressions on a talking head or other animated character. See for example, U.S. Pat. No. 4,884,972 issued Dec. 5, 189 to Elon Gasper who contemplates use in video games.

The film and television industries already address the human desire to watch and listen to important and interesting people. But there is also a basic human desire that people respond to us as individuals. No industry yet satisfies this desire that important people reply to us as individuals. Although the telephone provides a partial satisfaction of our desire to talk with other people, it is necessarily limited to living people who are willing to talk with us. Historical and imaginary people cannot talk with us and famous living people don't want to. Hence, there is is a strong but unfulfilled human desire waiting to be satisfied by new technology.

Often an illusion is as satisfying as a real experience, as any TV viewer knows. When you watch people on TV, what you are actually watching are little flickering dots of colored light from a chemically coated sheet of glass. The voice sounds you hear are from a vibrating cone of paper. That is reality. The rest of your experience is illusion. But it is an illusion that everyone wants to experience and will gladly pay money for. The desire to talk with interesting, charismatic and famous people is also strong and millions of people will be satisfied with an illusion of such conversations.

Talking video games (talkies) will change the nature of video games as dramatically as talking pictures changed silent film. Talkies will let users chat with images of famous people (living or historical or imaginary) and with animal-like characters, and participate in simulated adventures and dramas with interesting characters who talk to each player responsively. The conversations will be one-sided, of course, with the on-screen characters doing most of the talking. But talkies that stir human emotions like dramatic films will have lasting appeal, because they will satisfy a basic human desire, the desire to talk with other people.

SUMMARY OF THE INVENTION

This is a video game which takes the form of a branching story that simulates dialog between two or more animated characters on a TV screen and two or more human game players, thus simulating three-way or four-way dialog. Each character can be an animated cartoon, digitized live action, analog live action, a sprite or the like, and be player controlled or not.

BRIEF DESCRIPTION OF THE DRAWINGS

FIG. 5 is an animated sequence illustrating branching dialog in which two cartoon characters respond to sentences selected by a human player by talking to the human player and to each other.

FIG. 6 is an animated sequence illustrating branching dialog in which one animated character responds to a sentence selected by a human player and refers to a second character (not shown).

EXAMPLES OF GAME DIALOG

Figure 1:
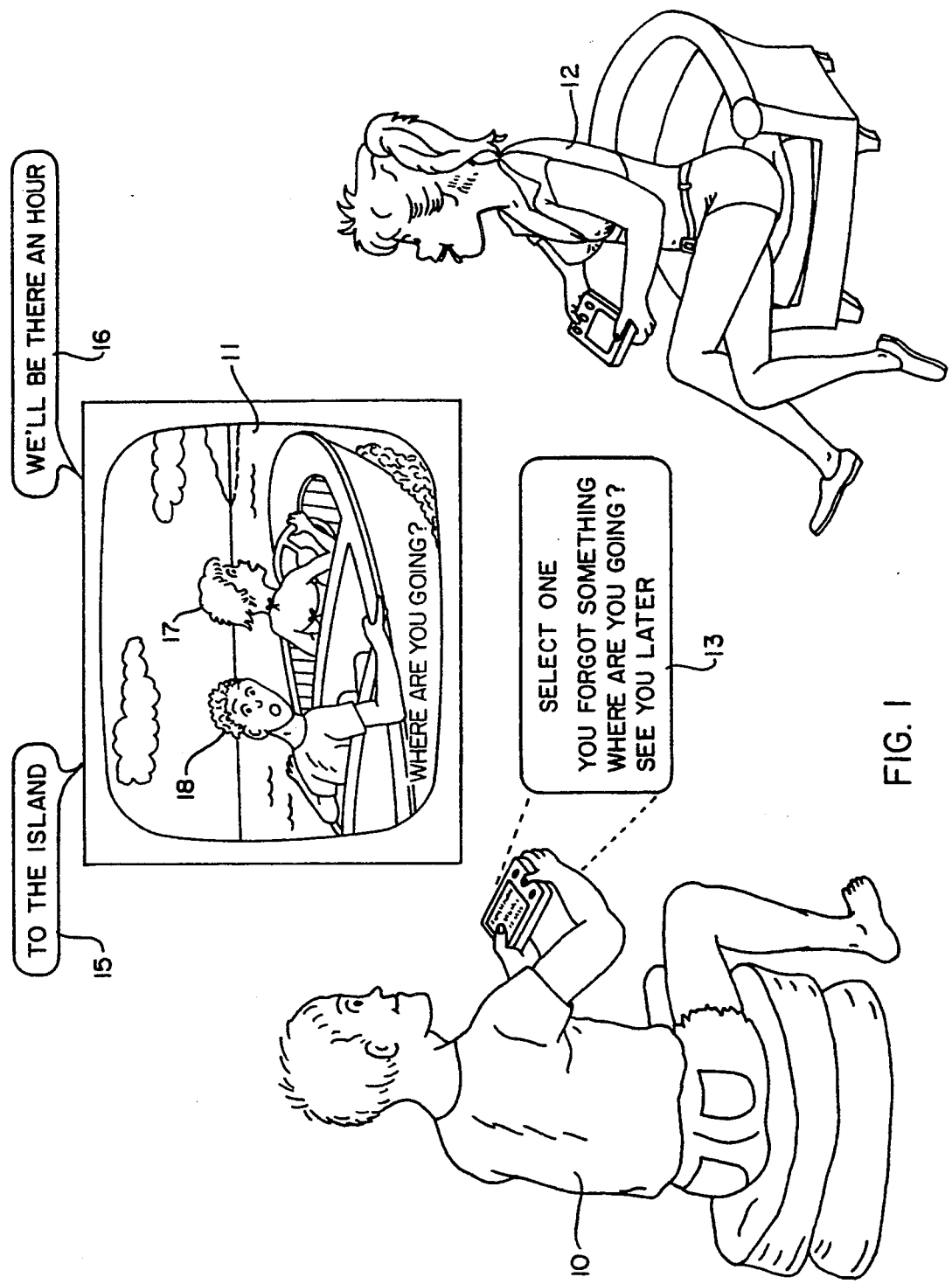
FIG. 1 illustrates an animated cartoon talking game with two human players who take turns selecting words to say to one or two animated characters on a TV screen who then respond to the words. Subtitles on the TV screen tell each player what is being said by the other player.

Each scene branches to two or more subsequent scenes, but there is also a second level of branching dialog within each scene. Referring to FIG. 6 as an example:

The animated character looks at you anxiously from the TV screen. In the background is a burning car. The character yells to you "My mother's trapped in the car. I can't get her out. She's going to die." You the player can choose either:

(1) "I've got a fire extinguisher in my car. I'll get it." or (2) "I've got a chain in my car, We can pull the door off." Either way the character replys "Ok, but do it quick! "and a few seconds later yells "Faster ! Faster ! Do something!"

Then, depending on your selection, the character is shown using a fire extinguisher or using a chain to pull the car door open. Or (see FIG. 7) hands reach up from the bottom of the TV screen to simulate the hands of a human player helping the animated character.

The next time you encounter this situation the character has been modified to seem like a different person. His/her personality is different. His/her voice and face are different (chosen by the system from a catalog of voices and faces). The burning car is a different color. And the dialog has changed. The character cries "Please help me. There's a little boy trapped in the car. I can't get the door open." You can choose either:

(1) "Loop this chain through the door. I'll hook it to my car." or (2) "Use this pipe to pry the door open." Either way the character yells "Hold on We'll get you out!"

Then, depending on your selection, the character is shown using a pipe or chain to pull open the car door. In either case the fire flares up and the character yells: "It's not working. Do something! Do something! "You can choose to say:

(1) "Keep trying It's almost open." or (2) "It's stuck. Pull harder—Harder!" or (3) "Too late. It's going to explode."

Note that there are two kinds of branching in each of the above sequences. The plea for help scene branches to the fire extinguisher scene or the pipe scene But there is also branching in the dialog within each scene. Dialog branching does not require different animation data except in mouth and body movements, but it adds intimate involvement in the dialog that scene branching cannot provide. If each scene has a rich dialog it requires much less video data than if each dialog branch required different video data.

Repeatedly showing the same background and characters with different dialog will expand the limited capacity of a CD-ROM disk into a large number of different story lines. Having the same background appear again and again is acceptable if a variety of talking characters do and say different things against that background.

For a human player to know how to respond, the alternative choices can be communicated to him in different ways:

1. by displaying a menu of words or phrases or icons, either on the TV screen or on an auxiliary display, giving alternative things to say to a non-player character or alternative things a player-controlled character will say;

3. by a talking character giving the alternatives verbally, by asking a question or by suggesting alternatives;

3. by a talking character showing the alternatives by holding a chain in one hand and a prybar in the other, for example;

4. by one talking character making a remark to a second talking character (either on-screen or off-screen);

A simulated voice dialog within each scene that does not require speech recognition can be of several different kinds:

1. spoken voice from animated character, then pushbutton response from player, then voice from animated character responding as if he had been spoken 2. spoken voice from animated character, then push-button response from player, then voice response from game (in a different voice) to simulate the player's side of the conversation, then voice from animated character responding as if he had been spoken to;

3. spoken voice from animated character, then push-button response from player, then voice from one animated character talking to a second animated character in the same scene responding to the push-button response;

4. spoken voice from first animated character speaking to a second animated character, then push-button response from player, then voice from the second character speaking the words selected by the player or responding to them;

6. spoken voice from animated character, then push-button response from a first player, then echo voice from the game system (in a voice different from character) so that a second player can hear what the first player has "said", then voice from the animated character responding to the first player's input, then push-button response from a second player, then echo voice response from game to simulate second player's side of the conversation so that the first player can hear what the second player has "said";

7. spoken voice from animated character, then push-button response from a first player, then sub-titles on TV screen so that a second player can see what the first player has "said", then voice from an animated character responding to the first player's sub-titles, then push-button response from the second player, then sub-titles to simulate second player's side of the conversation so that the first player can see what the second player has "said".

A similar dialog would follow in the same scene or in the next scene with different words. By definition, each scene change involves a substantial change in background or a change to another full-screen character and hence requires substantially different video (not just lip movements or showing the same background at different views or angles). Each scene should have several exchanges of dialog which require only minimal video changes such as head and lip movements. The video (both background and characters) may be rapidly changing and these changes may be the same every time a scene is repeated. But the voice sounds should be different and characters should say different things each time a scene is repeated.

Player-controlled characters say whatever the human player chooses to have them say, but non-player characters should also be programmed to say many different alternative things depending on what a player or player-controlled character has just "said". A scene may loop a dozen times with a non-player character saying something different each time and the alternative responses for each human player being different each time around the loop.

Menus showing two or three or four phrases to say are better than the old keyword-keyword method used in many role-playing games because menus do not force each player to guess about what can said. Guessing is fine for puzzle games, but is quite disrupting in role-playing games. Trial and error slows down the pace of the game, especially for other players, and weakens or destroys the suspense and emotional involvement that captivates a game player.

Hand-held display units are preferable to displaying menus on the TV screen, because in two-person games the menu displayed to one player may be different from the other player's menu. Part of the fun comes from not knowing what choices the other player has. Also, TV screen menus disrupt the illusion that a player is talking with a real TV character. Hence, the preferred embodiment of my invention makes use of hand-held menu display units with one push-button for each menu item and echo voices to avoid sub-titles on the TV screen.

DETAILED DESCRIPTION OF THE INVENTION

Referring to FIG. 1, in one embodiment of this invention a video game system displays on a TV screen 11 an animated picture sequence to two human game players. Human players 10 and 12 take turns selecting a phrase or sentence to "say" to a character or characters on a TV screen who then talk back responsively. In this example it is player 10's turn. Player 12's hand-held controller is blank, indicating that she cannot say anything at this moment. The TV screen shows two animated characters traveling in a boat or other vehicle. The characters are talking non-player characters, i.e. players can "talk" to the characters who will then talk back, but players cannot put words in their mouth, in this example. Each human player holds a hand-held controller with three push buttons next to a liquid-crystal display 13, shown enlarged in FIG. 1 for clarity.

As the boat scene begins, the video game system displays two or three or more alternative responses on display 13 or TV screen or other display device. While player 10 is deciding which button to press, a linking picture sequence (not shown) continues to show the same boat scene with one character looking back from the boat as if looking at player 10 standing on the dock. Player 10 selects one of the displayed responses (in this example "WHERE ARE YOU GOING?") which is then echoed as voice sounds or is displayed as sub-titles on the TV screen so that player 12 will know what player 10 has just said to an animated character. This character 18 answers responsively with voice sounds: "TO THE ISLAND." after which a second character responds with "WE'LL BE THERE AN HOUR." in response to what character 18 just said. Using incomplete sentences in each animated character's voice leads human players to pay attention to the echo voice or sub-titles. In the preferred embodiment the game system generates a voice to echo the words selected by player 10 so that player 12 hears what player 10 has "said" to the animated character. When it is player 12's turn, player 12's hand-held display will then show alternative words (not shown in FIG. 1) that she can "say" in response to what animated character 17 or 18 has said. Thus a three-way or four-way dialog can be simulated.

When alternative words or other verbal expressions are shown on LCD display 13, the words may be blinked a few times or display 13 may be flashed by alternating black and white a few times to attract a player's attention and prompt him to make a choice. Or a small light-emitting diode may be blinked on and off a few times as a prompting signal.

Before each game begins, display 13 may show identifying information for each player-controlled character so that each human player may select which character he or she wants to play. Alternatively, each player-controlled character may be shown on TV screen 11 and the question asked "Who wants to play this character?" for each character shown. The game system then records which hand-held controller responds so that later that character's words to say will be shown on display 13 only for the player who is playing that character (in this example player 10). A human player may also choose to play a player-controlled character that need not always be on the TV screen, but who may be off-screen (standing on the dock in FIG. 1), and can carry on a dialog with on-screen characters. Each echo voice is the voice of a player-controlled character.

Figure 2:
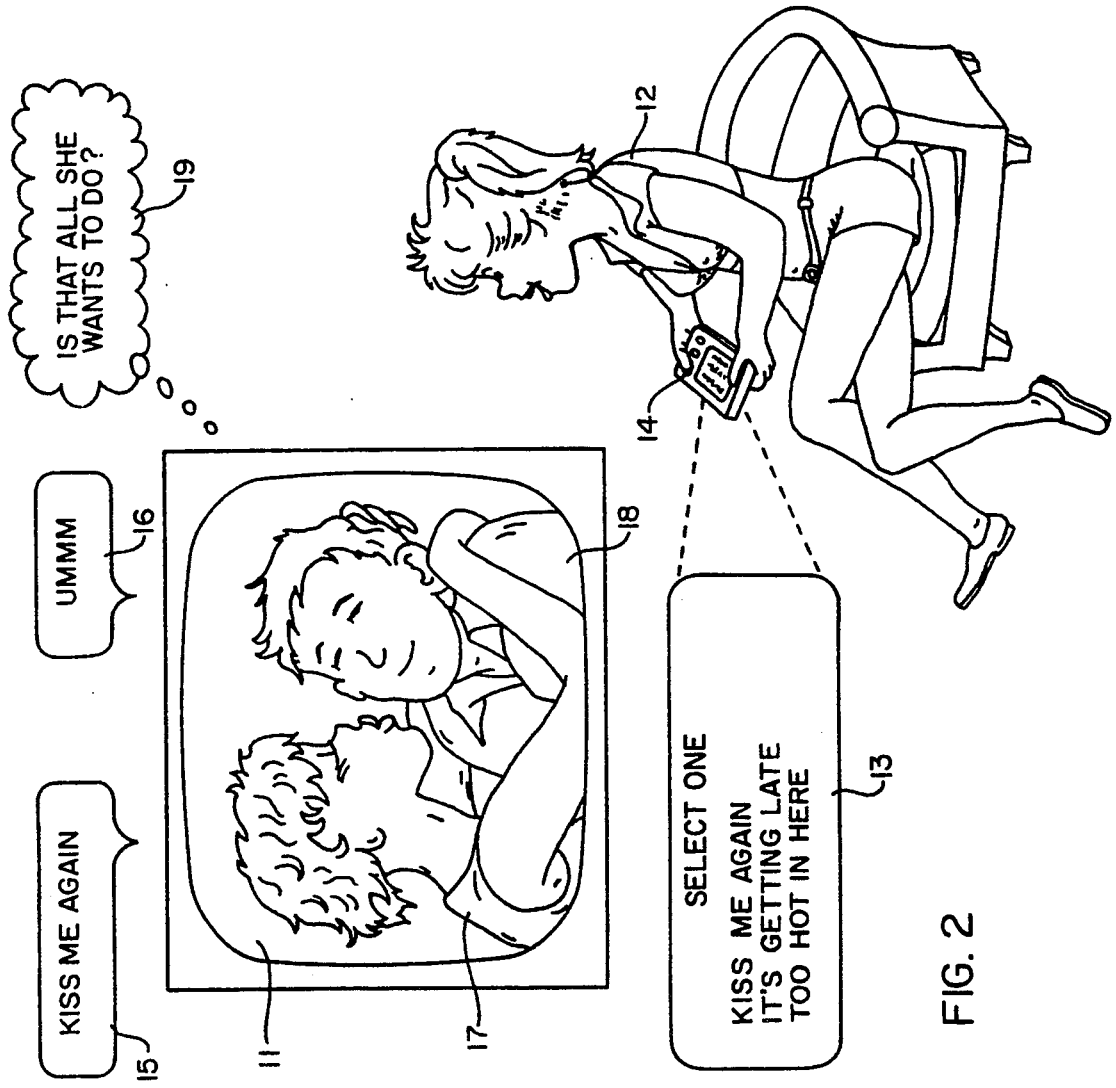
FIG. 2 illustrates an animated talking game with one human player and two animated cartoon characters on a TV screen who talk to the human and to each other.

Referring to FIG. 2, in another embodiment of the invention, a video game system generates for display on a TV screen 11 an animated picture sequence having two or more animated talking characters 17 and 18. In this example, character 17 is a player-controlled character that human player 12 controls. Player 12 plays the role of character 17 and can talk to character 18 and other characters in the game through character 17. Player 12 holds a hand-held controller with three push buttons next to a liquid-crystal display 13, shown enlarged in FIG. 2 for clarity. The game system displays three alternative responses on display 13. Player 12 selects one of the displayed responses (in this example "KISS ME AGAIN") with push button 14. Echo voice sounds 15 for character 17 then say the words selected from display 13. The words are directed at character 18 whose voice sounds 16 then respond to character 17.

The two animated characters 17 and 18 may respond in reverse sequence, that is, the non-player character 18 may say his line first so that the player-controlled character 17 can respond as ordered by human player 12. For example, after player 12 selects "KISS ME AGAIN", character 18 may say "WHAT DO YOU WANT TO DO?" a prerequisite sentence that is not one of the displayed alternatives, then character 17 can respond with "KISS ME AGAIN" which is responsive to what character 18 has just said. Such reversals can make the dialog seem more spontaneous.

Echo voices or sub-titles may also be used to express unspoken thoughts or the thoughts of non-speaking beings such as babies or animals, or inanimate objects such as a thinking rock. Cloud balloon 19 represents an unspoken thought of character 18 in FIG. 2 which is sounded (with mouth not moving) in response to spoken sentence 15 of character 17. Voice sounds for unspoken thoughts may be electronically altered to indicate to players that a voice is not a normal spoken voice. For example, unspoken thoughts can be given a hollow or tremulous sound or a whispering sound by electronically or digitally editing voice sound data before converting to audio.

Figure 3:
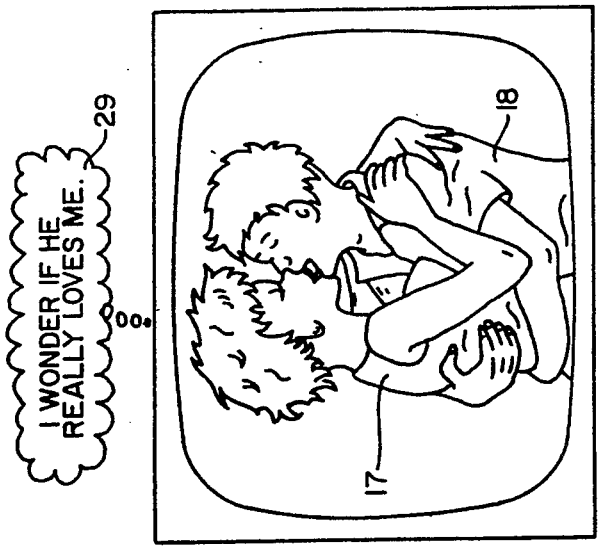
FIG. 3 is an animated cartoon illustrating a kissing scene in which one character's unspoken thoughts are sounded.

Referring to FIG. 3, when characters 17 and 18 perform a competitive or cooperative activity such as kissing, one of the characters may speak (with moving mouth) or think unspoken thoughts (sounded with unmoving or unsynchronized mouth) as in cloud balloon 29, responsive to the action being shown or to what was said or done in the prior sequence shown in FIG. 2 or in response to a phrase selected from display 13.

Figure 4:
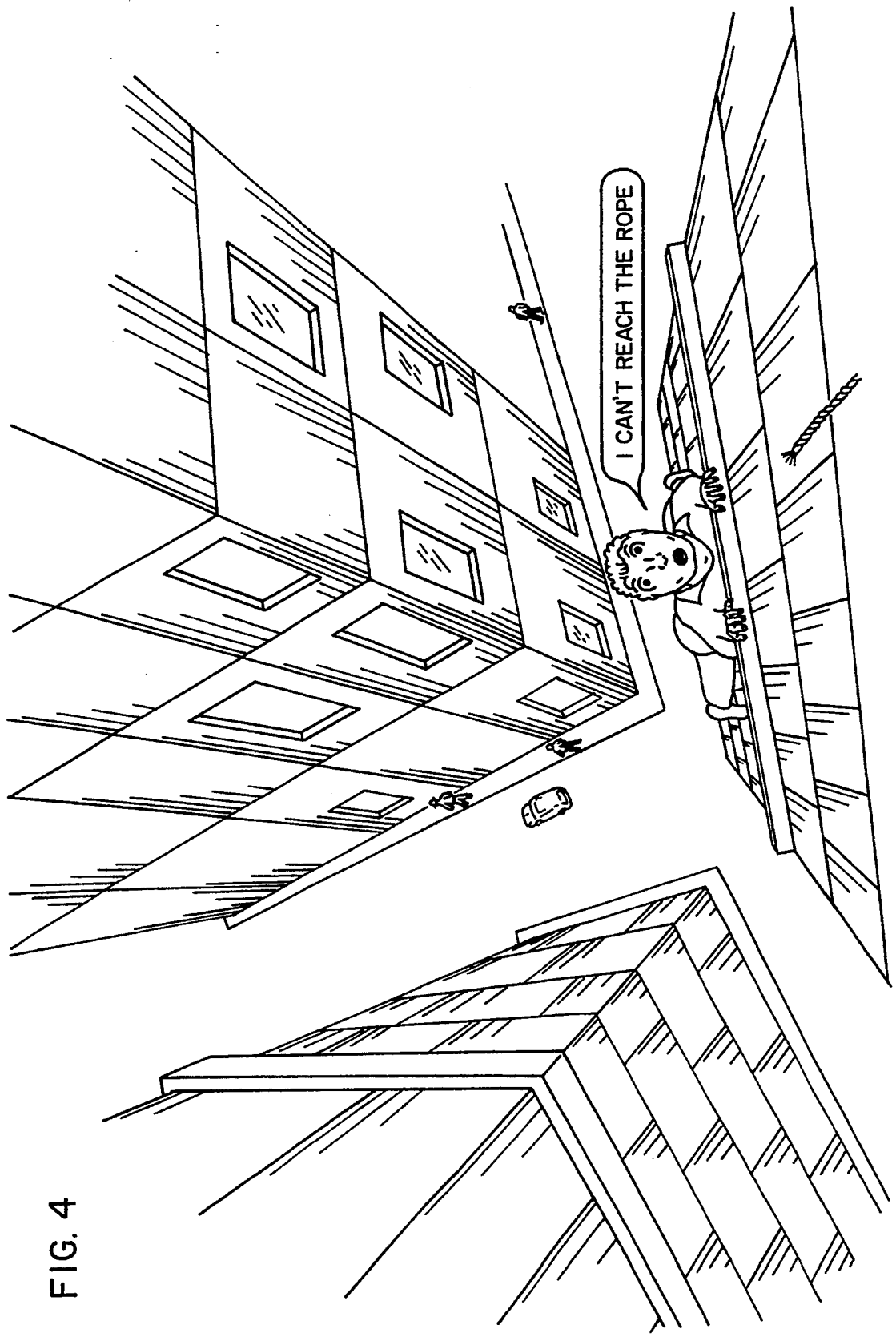
FIG. 4 is an animated cartoon illustrating a ledge-hanging scene in which a talking cartoon character requires immediate action by the human player.

Referring to FIG. 4, in another embodiment of this invention a video game system generates for display on a TV screen an animated picture sequence showing a character hanging by his fingers from a ledge on the outside of a building. His friends on the roof have thrown him a rope which is not long enough to reach the FIG. 4 character. This ledge-hanging situation sets up the next scene shown in FIG. 5 in which two animated characters exchange dialog with one or two human players and with each other regarding the FIG. 4 character.

Referring to FIG. 5, picture sequences 21, 25, and 28 are parts of one roof scene in which two talking characters discuss how to rescue the character in FIG. 4. One or two human players participate in the conversation by "saying" words or phrases or sentences to the animated characters who then answer responsively and ask questions or make remarks that lead to the next input by a player. The alternatives shown on display 22 are suggested solutions to the problem posed in sentence 20. When the human player 10 presses button 14 next to "Call emergency", one of the characters responds by asking question 23 to the other character who responds with question 24 directed at the human player. Question 24 is also accompanied by alternative actions 26. When a player presses the button next to "Slide down the rope", a character comments on this choice of action with sentence 27 in sequence 28. Thus a simulated verbal dialog can continue through several exchanges of words within the same scene.

Referring to FIG. 6, in another embodiment of this invention a video game system generates for display on a TV screen an animated picture sequence 31 and 32. The picture sequence has one scene showing a burning car in the background and a frightened woman 17 in the foreground. During part 31 of the sequence the woman's voice 15 says "Please help me! My mother's trapped in the car!" The game then displays two or more alternative responses on hand-held display 13 or on the TV screen or other display device. The human player 10 selects one of the displayed responses (such as "Pry the door open") and presses the corresponding push button 14 or equivalent. While the player is deciding which button to press, a linking picture sequence (not shown) continues to show the same scene with the woman looking anxiously at the player. When the player selects a response, part 32 of the animated sequence continues showing the same burning car scene with the woman's voice 16 answering responsively, for example: "I tried to, but I can't get it open" as at 16.

Selecting a response by pushing a button 14 can result in a change to a different scene, but in this FIG. 6 example the scene remains the same and only the dialog changes. Each of the three alternative responses on display 13 will result in a different answer by animated character 17. The animated sequences 31 and 32 are generated by the video game system by overlaying three moving pictures: (1) the background sequence showing the burning car with flames continually flickering, (2) a sprite or mosaic of sprites showing the woman character 17 moving in a natural manner against the background (This motion can be the same regardless of the dialog) and (3) mouth and other facial sprites selected (by table lookup) by the game system to be approximately lip-synchronized with voice sounds 15 and 16.

Since the player's response time is variable, sequence 31 or 32 with a closed mouth sprite should cycle continually until a button 14 response is made or until a time limit is reached, at which time a prompting picture sequence with words such as "Hurry! Hurry!" may be sounded and displayed with moving mouth sprites. The burning car can be any object such as a damaged bus, airplane, boat, or building that provides a danger situation.

Figure 7:
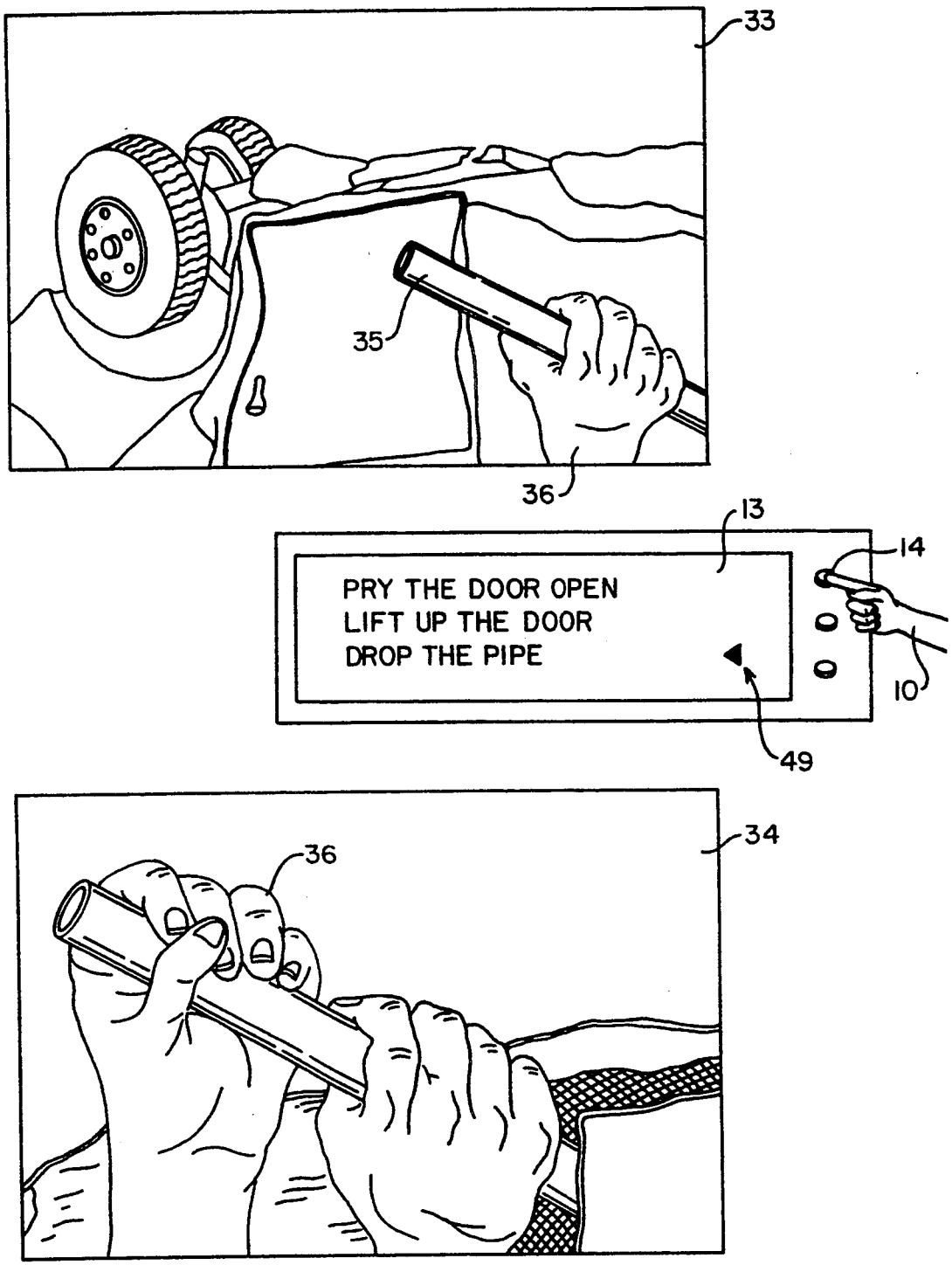
FIG. 7 is an animated sequence showing hands simulating the hands of a human player performing an action.

Referring to FIG. 7, the game system generates for display on the TV screen an animated sequence showing one or more hands 36 simulating the hands of a human player performing an action. In this example, animated sequence 33 shows a hand holding pipe 35 or a fire extinguisher or other such tool while the human player whose real hand 10 is illustrated pressing button 14 next to display 13 selects one of the alternative actions shown on display 13. Note that display 13 in FIG. 7 shows alternative actions which would result in scene changes, but display 13 in FIG. 6 shows alternative words or phrases to say to animated character 17 in a common scene. In FIG. 7, pressing button 14 to select "Pry the door open" results in picture sequence 34 showing hands 36 prying open the car door with pipe 35.

Figure 8:
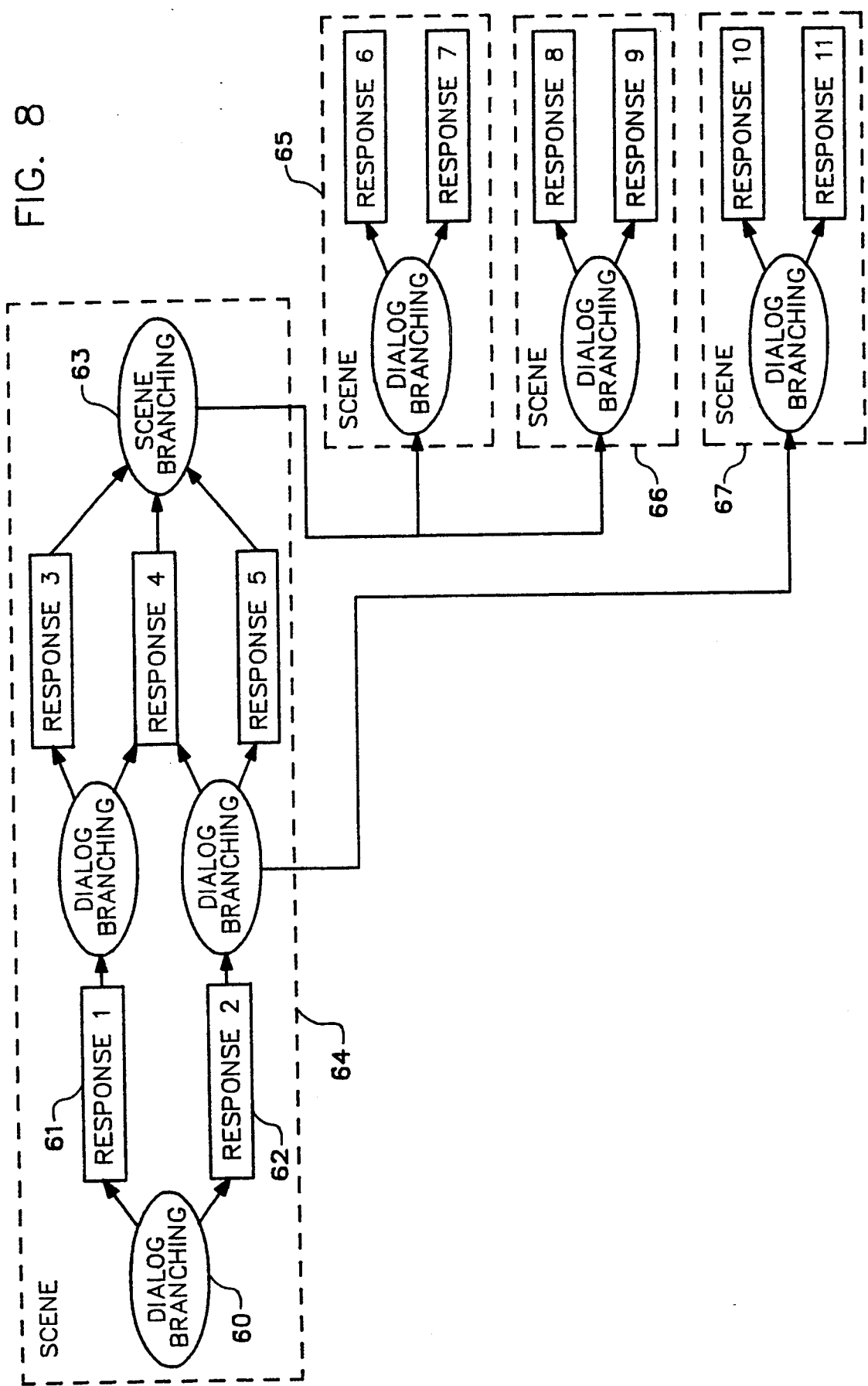
FIG. 8 is a flow diagram illustrating scene branching and dialog branching within each scene.

The flowchart shown in FIG. 8 illustrates the distinction between branching dialog and branching scenes. For example, in scene 64 branch point 60 is displayed to the player showing two alternative verbal responses 61 or 62. Either verbal response results in a different answer from an animated character, but not a scene change. However, the alternatives at branch point 63 will result in a scene change, either to scene 65 or to scene 66. Branch point 62 may result in either a scene change to scene 67 or a dialog branch depending on a player's choice.

Figure 9:
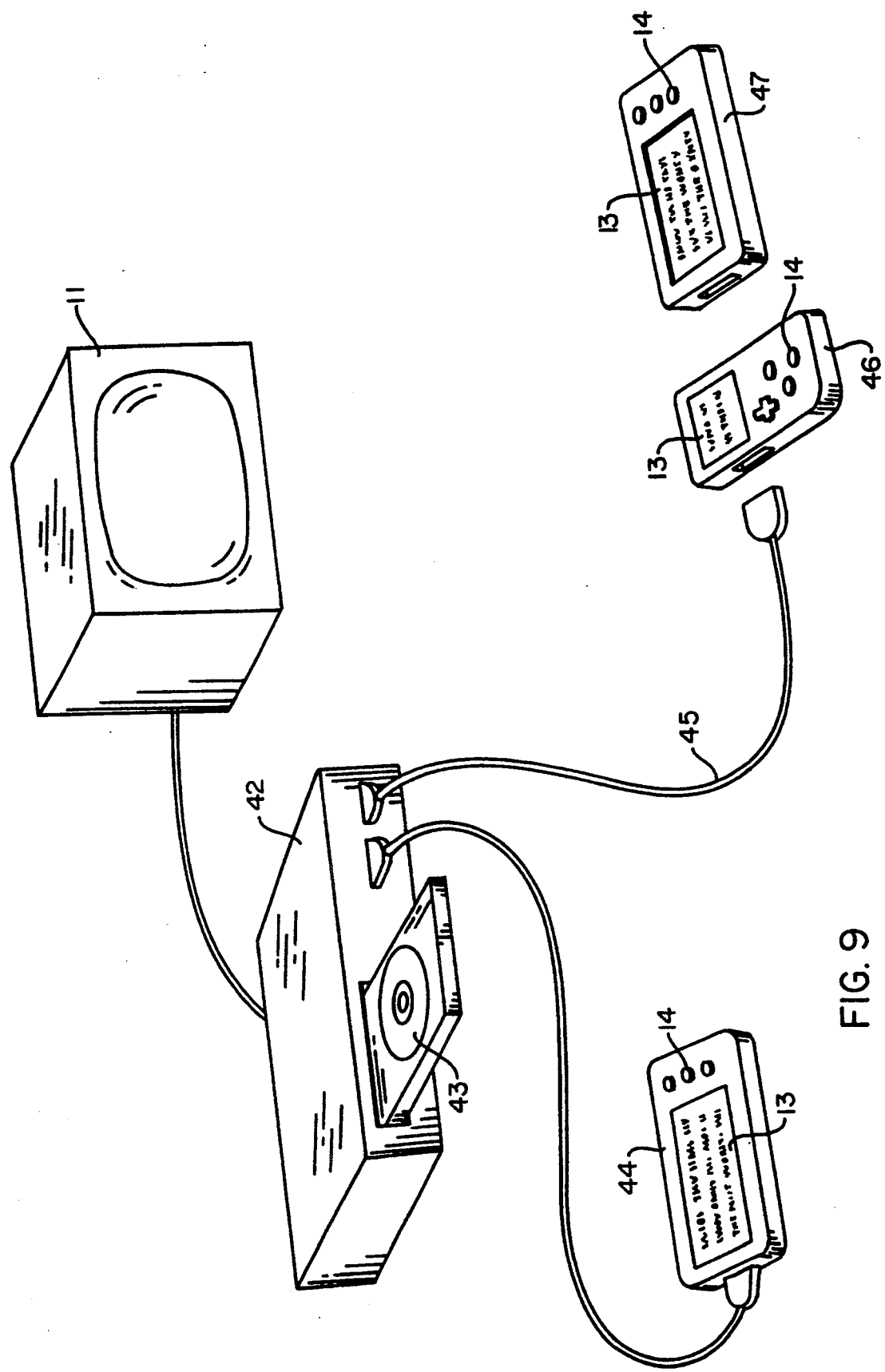
FIG. 9 is a pictorial view of a video game system having a CD-ROM disc drive connected to a TV set or video monitor with auxilary devices for displaying prompting words.

Referring to FIG. 9, video game system 42 is connected by cables to a TV set 11 or video monitor and to one or more hand-held control units 44 and 47 or portable game system 46, each having three push buttons 14 next to a liquid-crystal display 13. Infra-red or radio signals may be used instead of cables. System 42 includes a disk reader that reads digital data from a CD-ROM disk 43, or write-once disk or card or other medium containing digital data from which system 42 generates animated picture sequences, compressed audio for voice and other sounds, synchronizing data, and words to display on units 44, 46 and 47. Portable game system 46 with appropriate ROM program cartridge may substitute for units 44 and 47. Cable 45 connects game system 42 to display unit 44, 46 or 47 and transmits alternative prompting words or other verbal expressions for display on displays 13. Cable 45 also transmits push-button 14 responses to system 42.

If portable game system 46 has only one or two available push-buttons, selection from among responses shown on display 13 may be done as shown in FIG. 7 by pressing push-button 14 multiple times to position a pointer 49, cursor, or other such indicator next to (or on) a selected sentence.

To allow each background scene to be used with different animated characters who can move around against the background scene, the digital animation data for the background scene should be stored separately from the digital animation data for each character. Similarly, to allow each character to say many different sentences without a scene change, the digitized voice data should be independent of the animation data. In the preferred embodiment, animated character video, voice sound sequences and prompting word sequences are generated independently from separately stored digital data. Dialog data that is not used in one scene may be used later in a different scene with the same or different characters. The voice data may consist of sequences of codes or compressed digital recordings of words, phrases, word segments or phonemes in several distinctive voices so that each character can speak thousands of preprogrammed words or sentences. Similarly, the digital data for each animated character's body may be stored separately from sprite data for moving lips, facial expressions, and gestures, so that each character and its distinctive voice can be lip-synchronized with different mouth movements depending on which branch the dialog takes. The digital data for each animated character may also combine body, lips, expressions, gestures and voice sounds.

When a human player presses a button 14 (FIG. 2, 5, 6, or 7), the game system may generate a voice sound speaking the selected sentence as a substitute for the player's side of the dialog. The animated character then "responds" as if the generated voice sounds had been spoken by the human player. Because the player selects the words Which are actually sounded, he will quickly adjust to the fact that the spoken words he hears for his side of the dialog are initiated by his fingers rather than his vocal cords. This echo voice is important for games with multiple human players so that each player will hear what each of the other players has "said" to on-screen characters. Pushing a button 14 selects both a simulated verbal response to the previous words spoken by an animated character and also selects a new dialog sequence that corresponds to the simulated verbal response shown on display 13. The selected dialog sequence includes the face and voice of the animated character speaking words which are responsive to the player's selected verbal response.

Alternatively, sub-titles such as illustrated on TV screen 11 in FIG. 1 may be used instead of echo voices and be displayed on a TV screen or on a hand-held display unit as a substitute for the player's side of the dialog. Digitized live action picture sequences are equivalent to animated cartoon picture sequences for this invention. The term "verbal expression" means any word, words, phrase, sentence, question, expletive, curse, keyword, combination huh?" or "hmmm" or laughter or scream. The word kissing is used herein to mean simulated touching of one animated character's mouth to another animated character's mouth or other body part.

Although I have described the preferred embodiments of my invention with a degree of particularity, it is understood that the present disclosure has been made only by way of example and that equivalent steps and components may be substituted and design details changed without departing from the spirit and scope of my invention.

I claim:

1. A method of electronically simulating voice conversations between at least two talking animated characters, the words of one character being selected by a human player, comprising the steps of:
   (a) digitally storing a catalog of distinctive voices for at least two talking characters, each in the form of voice sound data representing a plurality of sentences, phrases, word segments or phonemes;
   (b) digitally storing a preprogrammed branching dialog between a first animated character and a second animated character, each branch comprising a plurality of alternative verbal expressions;
   (c) generating a video signal representing an image of said first and second characters for display on a video screen;
   (d) displaying on a hand-held controller apparatus a first set of alternatively selectable verbal expressions, each corresponding to a branch in said dialog;
   (e) receiving from said hand-held controller a manually initiated signal representing a selected verbal expression in said first set of verbal expressions, thereby selecting a branch in the dialog;

(f) digitally reading from said catalog of voices first voice sound data that corresponds to said selected verbal expression of the voice of said first character;

(g) generating an audio signal from said first voice sound data representing the voice of said first character speaking said selected verbal expression;

(h) digitally reading from said catalog of voices second voice sound data for the voice of said second character speaking the verbal expression that follows next in the selected branch of the dialog;

(i) generating an audio signal from said second voice sound data representing the voice of said second character; and (j) displaying on said hand-held controller apparatus a second set of alternatively selectable verbal expressions that follows next for said first character in the selected branch of the dialog.

2. The method of claim 1, wherein one of said characters is shown hugging or kissing the other character.

3. The method of claim 1, wherein said hand-held controller is a portable game system with program cartridge.

4. A method of electronically simulating voice conversations between at least two talking animated characters, the words of one character being selected by a human player, comprising the steps of:

(a) digitally storing a catalog of distinctive voices for at least two talking characters, each in the form of voice sound data representing a plurality of sentences, phrases, word segments or phonemes;

(b) digitally storing a preprogrammed branching dialog between a first animated character and a second animated character, each branch comprising a plurality of alternative verbal expressions;

(c) generating a video signal representing an image of said first and second characters for display on a video screen;

(d) displaying on a hand-held controller apparatus a first set of alternatively selectable verbal expressions, each corresponding to a branch in said dialog;

(e) receiving from said hand-held controller a manually initiated signal representing a selected verbal expression in said first set of verbal expressions, thereby selecting a branch in the dialog;

(f) digitally reading from said catalog of voices first voice sound data that corresponds to said selected verbal expression for the voice of said first character;

(g) generating an audio signal from said first voice sound data representing the voice of said first character speaking said selected verbal expression;

(h) changing said video signal to indicate that the first character is speaking to the second character;

(i) digitally reading from said catalog of voices second voice sound data for the voice of said second character speaking the verbal expression that follows next in the selected branch of the dialog;

(j) generating an audio signal from said second voice sound data representing the voice of said second character;

(k) changing said video signal to indicate that the second character is speaking to the first character; and (l) displaying reading from said catalog of voices second voice sound data for the voice of said second character speaking the verbal expression that follows next in the selected branch of the dialog;

(j) generating an audio signal from said second voice sound data representing the voice of said second character;

(k) changing said video signal to indicate that the second character is speaking to the first character; and (l) displaying on said hand-held controller apparatus a second set of alternatively selectable verbal expressions that follow next for said first character in the selected branch of the dialog.

5. The method of claim 4, wherein said video signal is changed to show moving lips on the face of the first character when said audio signal is generated from said first voice sound data; and wherein said video signal is changed to show moving lips on the face of the second character when said audio signal is generated from said second voice sound data.

6. The method of claim 5, wherein said moving lips are lip-synchronized with the corresponding voices in said audio signal.

7. The method of claim 4, further comprising the step of altering either or both of said audio signals so that the signal indicates unspoken thoughts of an on-screen character.

8. A method of electronically simulating voice conversations between at least two on-screen talking animated characters and an off-screen talking character, comprising the steps of:

(a) digitally storing a catalog of distinctive voices for at least three talking characters, each in the form of voice sound data representing a plurality of sentences, phrases, word segments or phonemes;

(b) digitally storing a preprogrammed branching dialog between a first on-screen character and a second on-screen character and an off-screen character, each branch comprising a plurality of alternative verbal expressions;

(c) generating a video signal representing an image of said first and second on-screen characters for display on a video screen;

(d) displaying on a hand-held controller apparatus a first set of alternatively selectable verbal expressions, each corresponding to a branch in said dialog;

(e) receiving from said hand-held controller a manually initiated signal representing a selected verbal expression in said first set of verbal expressions, thereby selecting a branch in the dialog;

(f) digitally reading from said catalog of voices first voice sound data that corresponds to said selected verbal expression for the voice of said off-screen character;

(g) generating an audio signal from said first voice sound data representing the voice of said off-screen character speaking said selected verbal expression;

(h) digitally reading from said catalog of voices second voice sound data for the voice of said first on-screen character speaking the verbal expression that follows next in the selected branch of the dialog;

(i) generating an audio signal from said second voice sound data representing the voice of said first on-screen character;

(j) digitally reading from said catalog of voices third voice sound data for the voice of said second on-screen character speaking the verbal expression that follows next in the selected branch of the dialog;

(k) generating an audio signal from said third voice sound data representing the voice of said second on-screen character; and (l) displaying on said hand-held controller apparatus a second set of alternatively selectable verbal expressions that follows next for said off-screen character in the selected branch of the dialog.

9. The method of claim 8, wherein said video signal is changed to indicate which of said on-screen characters is speaking.

10. The method of claim 9, wherein said video signal is changed to show moving lips on the face of said first on-screen character when said audio signal is generated from said second voice sound data and to show moving lips on the face of said second on-screen character when said audio signal is generated from said third voice sound data.

11. The method of claim 10, wherein said moving lips are lip-synchronized with the corresponding voices in said audio signal.

12. The method of claim 8, wherein said hand-held controller is a portable game system with program cartridge.

13. The method of claim 8, wherein said selected verbal expression for said off-screen character is displayed on said video screen.

14. The method of claim 8, wherein one of said characters is shown hugging or kissing the other character.

15. A method of electronically simulating voice conversations between at least two talking animated characters, the words of the characters being selected by two corresponding human players, comprising the steps of:

(a) digitally storing a catalog of distinctive voices for at least two talking characters, each in the form of voice sound data representing a plurality of sentences, phrases, word segments or phonemes;

(b) digitally storing a preprogrammed branching dialog between a first animated character and a second animated character, each branch comprising a plurality of alternative verbal expressions;

(c) generating a video signal representing an image of said first and second characters for display on a video screen;

(d) displaying on a first hand-held controller apparatus a first set of alternatively selectable verbal expressions, each corresponding to a branch in said dialog;

(e) receiving from said first hand-held controller a manually initiated signal representing a first selected verbal expression in said first set of verbal expressions, thereby selecting a branch in the dialog;

(f) digitally reading from said catalog of voices first voice sound data that corresponds to said first selected verbal expression for the voice of said first character;

(g) generating an audio signal from said first voice sound data representing the voice of said first character speaking said first selected verbal expression;

(h) displaying on a second hand-held controller apparatus a second set of alternatively selectable verbal expressions that follows next for said second character in the selected branch of the dialog;

(i) receiving from said second hand-held controller a manually initiated signal representing a second selected verbal expression in said second set of verbal expressions, thereby selecting a next branch in the dialog;

(j) digitally reading from said catalog of voices second voice sound data that corresponds to said second selected verbal expression for the voice of said second character; and (k) generating an audio signal from said second voice sound data representing the voice of said second character speaking said second selected verbal expression.

16. A method of electronically simulating voice conversations between at least two on-screen talking animated characters and two off-screen talking characters, comprising the steps of:

(a) digitally storing a catalog of distinctive voices for at least four talking characters, each in the form of voice sound data representing a plurality of sentences, phrases, word segments o phonemes;

(b) digitally storing a preprogrammed branching dialog between a first on-screen character and a second on-screen character and a first off-screen character and a second off-screen character, each branch comprising a plurality of alternative verbal expressions;

(c) generating a video signal representing an image of said first and second on-screen characters for display on a video screen;

(d) displaying on a first hand-held controller apparatus a first set of alternatively selectable verbal expressions, each corresponding to a branch in said dialog;

(e) receiving from said first hand-held controller a manually initiated signal representing a first selected verbal expression in said first set of verbal expressions, thereby selecting a branch in the dialog;

(f) digitally reading from said catalog of voices first voice sound data that corresponds to said first selected verbal expression for the voice of said first off-screen character;

(g) generating an audio signal from said first voice sound data representing the voice of said first off-screen character speaking said first selected verbal expression;

(h) digitally reading from said catalog of voices second voice sound data for the voice of said first on-screen character speaking the verbal expression that follows next in the selected branch of the dialog;

(i) generating an audio signal from said second voice sound data representing the voice of said first on-screen character;

(j) displaying on a second hand-held controller apparatus a second set of alternatively selectable verbal expressions that follows next for said second off-screen character in the selected branch of the dialog.

(k) receiving from said second hand-held controller a manually initiated signal representing a second selected verbal expression in said second set of verbal expressions, thereby selecting a next branch in the dialog;

(l) digitally reading from said catalog of voices third voice sound data that corresponds to said second selected verbal expression for the voice of said second off-screen character;

(m) generating an audio signal from said third voice sound data representing the voice of said second off-screen character speaking said second selected verbal expression;

(n) digitally reading from said catalog of voices fourth voice sound data for the voice of said second on-screen character speaking the verbal expression that follows next in the selected branch of the dialog; and (o) generating an audio signal from said fourth voice sound data representing the voice of said second on-screen character.

* * * * *